Feb. 16, 1971 F. THORSOE 3,564,385
GENERATOR PRODUCING CONTROL SIGNALS FOR STRIKING THE
CONTROLLABLE RECTIFIERS OF AN INVERTED CONVERTER
Filed Jan. 21, 1969
3 Sheets-Sheet 1

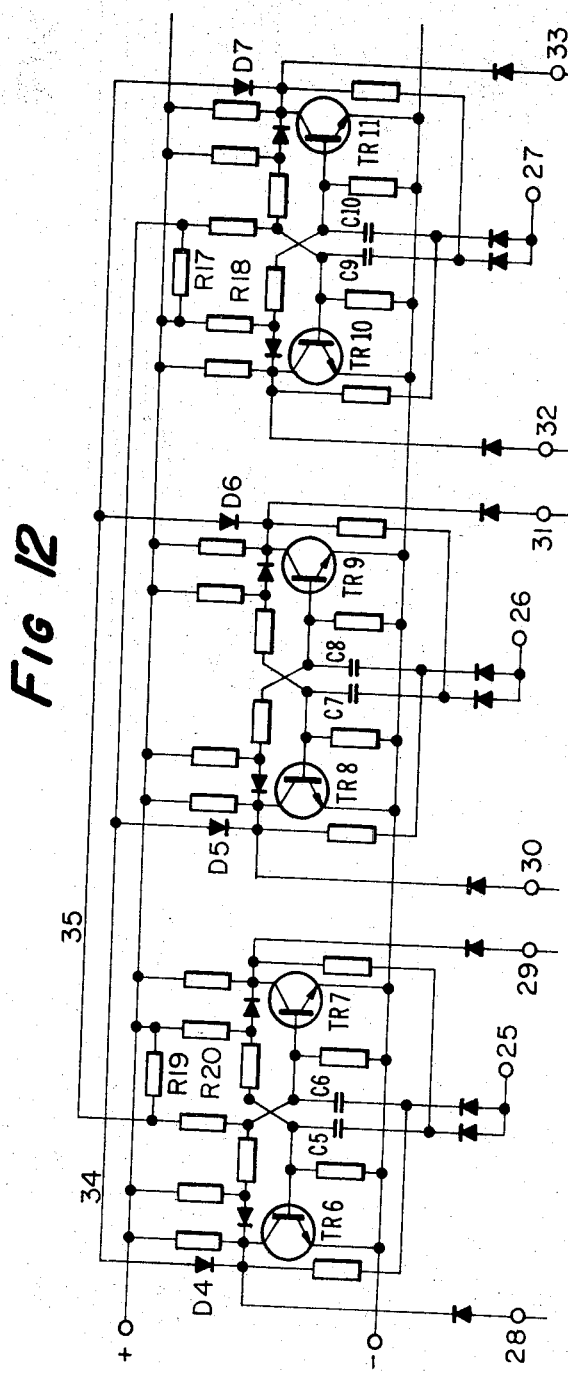
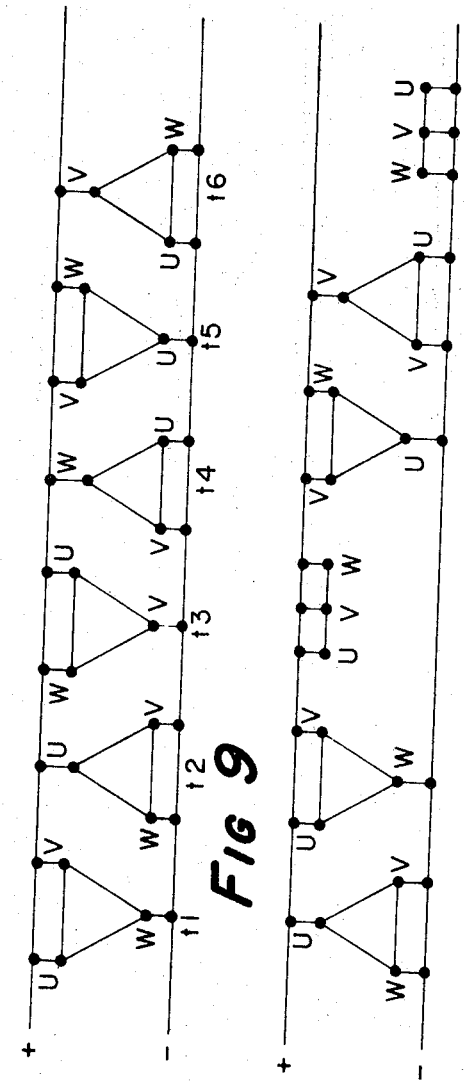

United States Patent Office 3,564,385
Patented Feb. 16, 1971

3,564,385
GENERATOR FOR PRODUCING CONTROL SIGNALS FOR STRIKING THE CONTROLLABLE RECTIFIERS OF AN INVERTED CONVERTER
Flemming Thorsoe, Augustenborg, Denmark, assignor to Danfoss A/S Nordborg, Denmark, a company of Denmark
Filed Jan. 21, 1969, Ser. No. 792,685
Claims priority, application Germany, Jan. 17, 1968, P 16 13 769.2
Int. Cl. H02m 7/00
U.S. Cl. 321—5
10 Claims

ABSTRACT OF THE DISCLOSURE

A generator controls a three phase converter having six controllable rectifiers and a common quenching controllable rectifier. A frequency emitter is controlled by an input voltage and emits a controlled frequency which is six times the three phase frequency. The frequency emitter controls the common quenching rectifier and also controls a three stage annular counter. The three outputs of the annular counter control three bistable multivibrator frequency dividers, each having two outputs. The output of each frequency divider is connected to a gate circuit which in turn controls one of the six controllable rectifiers. A correction circuit interconnects the three multi-vibrators to insure the proper sequency of firing of the six controllable rectifiers.

---

The invention relates to a generator for producing control signals for striking the controllable rectifiers of a three-phase inverted converter, having common quenching means, wherein an annular counter is fed with impulses of a frequency six times as great as the required frequency and, by its output signals, controls six gate circuits through which the striking signals are passed to the controllable rectifiers.

In inverted converters having common quenching means for all the rectifiers, a considerable saving in compenents is achieved since it is not necessary to associate a quenching circuit with each individual rectifier. On the other hand, provision must be made for each quenched rectifier, that would have to remain conductive after the phase cycle, to be struck again immediately thereafter. Consequently, the striking signals, which are high-frequency impulses, for example, must be present during the entire required striking phase, i.e., the gate circuit must be open during the whole of this phase. In this connection, it is of importance to start from the frequency six times as great as the required frequency, since the quenching impulses can be derived directly from the initial frequency.

A generator of this kind is known wherein the output points of a six-stage annular counter are each connected to a gate circuit controlling the high-frequency striking impulses. Provision is made for each two consecutive stages to be conductive. This pattern is shifted in the annular counter with the frequency six times that required at the output point of the inverted converter. Because of the six-stage annular counter, this arrangement is very expensive as regards circuitry. The striking phase of each rectifier is limited to 120°. Phase-reversal is possible only by interchanging two conductors at the output of the inverted converter.

The object of the invention is to provide a generator that is of the simplest possible design and is more efficient and has more possible applications than the known generator.

According to the invention, this object is achieved by using a three-stage annular counter, to each of the outputs of which is connected a two-stage frequency divider with which two of the gate circuits are associated.

A three-stage annular counter and three two-stage frequency dividers represent a much simpler arrangement than a six-stage annular counter. Furthermore, phase-reversal can be achieved simply by interchanging two conductors, leading from an output point of the annular counter to a frequency divider. Nor do any difficulties arise in deriving, from the two-stage frequency dividers, signals which keep the gate circuit open over a full 180°.

It is particularly advantageous if the two-stage frequency dividers take the form of bi-stable multi-vibrators to each of the two output points of which there is connected a gate circuit, and if each gate circuit is associated with two controllable rectifiers connected in series. The bistable multi-vibrators are alternately brought into the one and the other stable position by the input signal, which is the same in each case, i.e. the multi-vibrators change over once during each passage through the annular counter. Consequently, the series-connected gate circuits each open over a full 180°. Since only one of the two series-connected gate circuits can be opened at any time and these two gate circuits are associated with the series-connected controllable rectifiers of the inverted converter, there never arises the risk that, due to some fault in the control generator, the two rectifiers are struck simultaneously and a short-circuit is thereby caused.

A particularly simple annular counter is obtained if this consists in known manner of NAND-stages.

The position of the frequency dividers at the moment of switching in is normally a matter of chance. It is therefore expedient if a correction circuit is associated with the frequency dividers to bring about compulsorily the correct sequency of their output signals.

Here, in the simplest case, the correction circuit is brought into action in dependence upon three controllable rectifiers of like polarity being controlled in the same condition, since this is an indication that the sequence is incorrect.

In a preferred embodiment, and to reduce the cost of the circuitry, provision is made for the correction circuit, on the one hand, to be brought into action in dependence upon the control signals for the controllable rectifiers of one polarity and only the control signals for one of these controllable rectifiers to be corrected, and on the other hand for the correction circuit to be brought into action in dependence upon the control signals for the controllable rectifiers of the other polarity and only the control signals for one of these controllable rectifiers to be corrected.

When bistable multi-vibrators are used, the correction circuit can contain a resistor with a tapping between the base of a multi-vibrator transistor and one pole of the supply voltage, the tapping being connected through rectifiers to the collector of a transistor in each of the two other multi-vibrators, and the three other transistors of the multi-vibrators being connected in an analogous manner.

In a preferred embodiment, the gate circuits are formed by blocking oscillators and the collector voltage of the multi-vibrator transistors determine the base current of the transistors of the blocking oscillators through rectifiers. Here, the emitters of all the transistors of the blocking oscillators can be interconnected and connected to the other pole of the supply voltage by way of a Zener diode. This results is a very simple arrangement.

For feeding the three-stage annular counter, it is of advantage to cause the feed impulses to be produced by a uni-junction sweep generator, the charging of the condenser of which is controlled through a transistor in dependence upon the operating voltage of the inverted converter, the impulses controlling the counter as well as the quenching impulses being taken from the first base of the uni-junction transistor. In this way, the output voltage of the inverter converter is utilized to control the frequency of the converter. A polyphase induction motor, having approximately the same torque at each speed, can be operated in this way.

Here, the quenching impulses in the sweep generator and the striking impulses in the blocking oscillators can be collected by way of transformers. Also, the feed-back transformer of the blocking oscillator may have a second secondary winding for collecting the striking impulses. The number of transformers is thereby reduced.

The invention will now be described in more detail by reference to an embodiment illustrated in the drawing, wherein:

FIG. 6 shows the sequency in which the phases are connected to the direct-current conductors;

Figure 7:
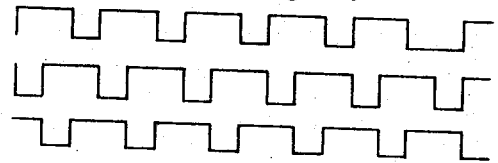
Figure 8:
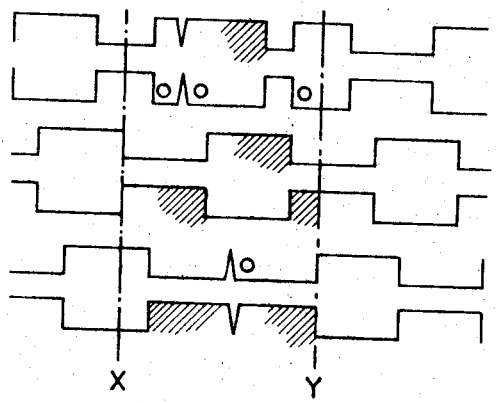
Figure 10:
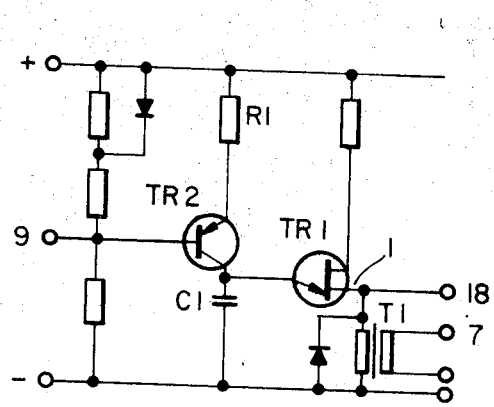
Figure 11:
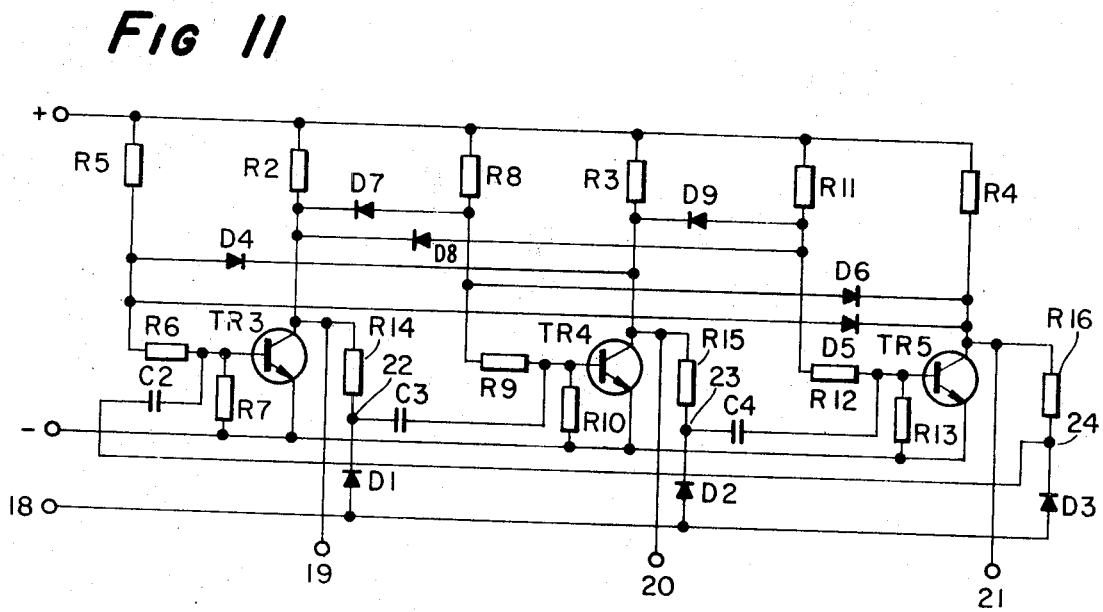
Figure 13:
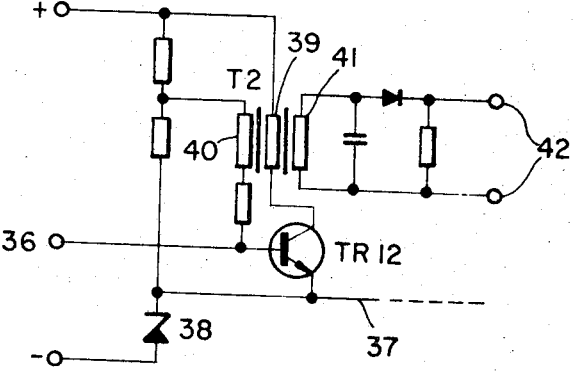

FIG. 7 again illustrates the signals at the output points of the annular counter;

FIG. 8 shows the associated signals at the output points of the frequency dividers, these being straightened;

FIG. 9 shows the sequence in the connections to the direct-current conductors when coordination is incorrect;

FIG. 10 is the connection diagram for a frequency emitter, controlled in dependence of voltage;

FIG. 11 is the connection diagram for a three-stage annular counter;

FIG. 12 shows the connection diagram for three bistable multi-vibrators plus correction circuit; and FIG. 13 is the connection diagram for a blocking oscillator designed as a gate circuit.

Figure 1:
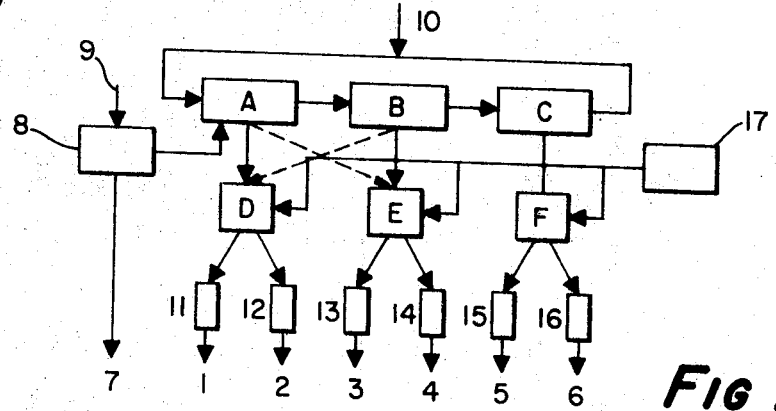
FIG. 1 shows a block circuit diagram of the generator of the invention.
Figure 2:
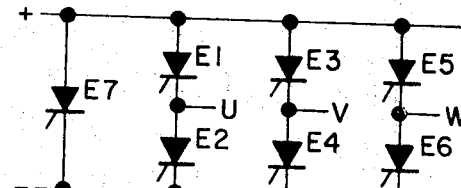
FIG. 2 is a schematic illustration of an inverted converter for which the generator is intended.
Figure 3:
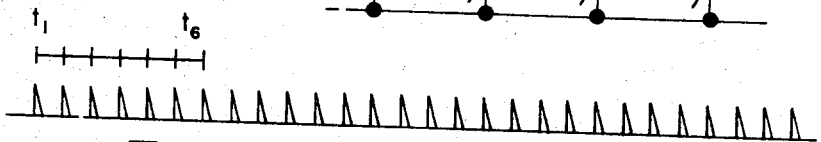
FIG. 3 illustrates the quenching impulses.

The block circuit diagram of FIG. 1 illustrates a generator which is intended to emit, at its outputs 1–6, striking impulses for striking the controllable rectifiers E1–E6 of an inverted converter as shown in FIG. 2, and, at its output 7, quenching impulses for the controllable quenching rectifiers E7 of the inverted converter. The rectifiers must thereby be so controlled that the frequency in which the phases U, V, and W are connected follows the course illustrated in FIG. 6.

Figure 4:
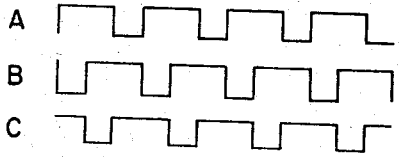
FIG. 4 shows the signals occurring at the output points of the annular counter.

A frequency emitter 8 receives at its input point 9 a signal proportional to the input voltage of the inverted converter and produces a frequency $f_0$, proportional to this voltage, which frequency corresponds to six times the required frequency in the three-phase power supply U, V and W. Quenching impulses of this frequency $f_0$ are emitted at the output 7. Timing impulses of the same frequency are sent to the annular counter 10 consisting of the stages A, B and C. The counter therefore revolves twice in each required phase of the three-phase power supply U, V and W. The signals illustrated in FIG. 4 occur at its outputs, the upper line in each case representing the off condition and the lower line the on condition.

Figure 5:
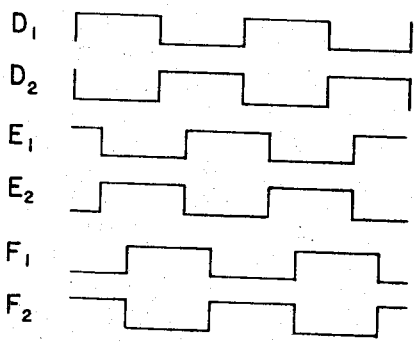
FIG. 5 shows the associated signals at the outputs of the frequency dividers.

The output signals from the annular counter are passed to three frequency dividers D, E and F, which change from one switching stage to the other as each impulse is received. Consequently, the signals illustrated in FIG. 5 occur at their output points. These signals are used to control the gate circuits 11–16, which emit the required striking signals at their outputs 1–6. A correction circuit 17 monitors the frequency dividers and provides switching signals in the appropriate manner if they do not give the correct sequence. Also, as indicated in broken lines, the outputs of the two counter stages A and B can be interchanged. In this way, the direction of the three-phase supply can be altered.

From the foregoing description it will be seen that the rectifiers E1, E3 and E6 are struck in the period $t_1$. At the end of this period, all three rectifiers are quenched. Immediately thereafter, the rectifiers E1, E4 and E6 are struck for the period $t_2$. This continues until, during the period $t_6$, the rectifiers E2, E3 and E6 are struck. Since, in each case, a quenching impulse is sent at the end of the period and all the rectifiers are quenched, a striking signal in the form of high-frequency impulses is sent during the entire pass-through period of the rectifiers. The corresponding times are given in the diagram of FIG. 5, wherein it should be noted that the pairs of rectifiers of each branch are in each case supplied by the same frequency dividers with associated gate circuits. This means that the outputs 1–6 also correspond to the rectifiers E1–E6 as regards the numerals used.

At the moment of switching in, it may happen that the individual frequency dividers have an incorrect output position, so that the form of output signals illustrated in front of the line X in FIG. 8 occurs in the frequency dividers. This leads to defective operation as shown by the sequence of the phases in FIG. 9. The correction circuit 17 now intervenes. It determines when three rectifiers of like polarity, i.e., either E1, E3 and E5 or E2, E4 and E6 would be struck or quenched and in each case corrects the behaviour of only one of the three rectifiers. Let it be assumed in the present case that, of the rectifiers connected to the positive conductor, rectifier E5 is compulsorily struck when the two other rectifiers E1 and E3 are quenched. Of the rectifiers connected to the negative conductor, the rectifier E2 will be compulsorily struck when rectifiers E4 and E6 are quenched.

The hatched areas in FIG. 8 show when the condition for disconnecting the two rectifiers E1 and E3 or E4 and E6 is met; a small circle in each case then indicates that the third rectifier E5 and E2 respectively of the group is connected. It can be seen that the correction is cut off for approximately one cycle, i.e., up to the moment Y. This method, also known as "footstep control" can be carried out using only two control conductors that have to be corrected.

The frequency emitter illustrated in FIG. 10 produces at its outputs 17 and 18 impulses having a frequency that is proportional to the voltage at the input 9. The frequency emitter illustrated in FIG. 10 produces at its outputs 17 and 18 impulses having a frequency that is proportional to the voltage at the input 9. The frequency emitter has a unijunction transistor Tr1, the base 1 of which is connected directly to the output 18 and, by way of a transformer t1, to the output 17. Associated with the transistor is a charging condenser C1, which is charged by way of a transistor Tr2 and a resistor R1. As soon as the voltage at the condenser C1 has reached a prescribed threshold value, this discharges through the unijunction transistor Tr1, sending out an impulse. The resistance of the transistor Tr2 is governed by the voltage applied at the output 9. Accordingly, the condenser C1 is charged at a varying rate. The other elements of the circuit are not discussed in detail since they are not necessary to an understanding of the invention. The resistor R1 may also be adjustable.

The three-stage annular counter 10, illustrated in FIG. 11, receives by way of its input 18', impulses from the output 18 of the frequency emitter. The counter has three transistors, Tr3, Tr4 and Tr5, the emitters of which are connected to the negative conductor. The collectors are connected to the positive conductor through resistors R2, R3 and R4; the outputs 19, 20 and 21 are connected directly to the collectors. Each three resistors R5, R6, R7 and R8, R9, R10 and R11, R12, R13 form a voltage divider to which are connected the bases and, in each case, a condenser C2, C3 and C4. The other ends of the condensers lead to junctions 22, 23 and 24, which, on the one hand, are connected to the output 18 through rectifiers D1, D2 and D3 and, on the other, to the collector of each preceding stage, through resistors R14, R15 and R16.

Rectifiers D4 and D5 connect the point between the resistors R5 and R6 to the collectors of the transistors Tr4 and Tr5. Rectifiers D6 and D7 connect the point between the resistors R8 and R9 to the collectors of the transistors Tr5 and Tr3. Rectifier D8 and D9 connect the point between the resistors R11 and R12 to the collectors of the transistors Tr3 and Tr4.

Let it be assumed that the transistor Tr3 is passing current, whilst the two other transistors are not. Consequently, a negative potential obtains at the output 19 (and at the collector of the transistor Tr3), whilst a positive signal occurs at the outputs 20 and 21 (and at the associated collectors of the transistors). This condition is stable, since, by way of the rectifiers D7 and D8, the points between the resistors R8 and R9, and R11 and R12, respectively, and thus the bases of the transistors Tr4 and Tr5 are brought to a negative potential. At the same time, the condensers C2 and C4 are charged in such a way that their plates, shown on the left in the drawing, are positive, since they lie between a point of positive potential at the collector of the transistors Tr4 and Tr5 and one at a base of the other transistor, i.e., a point of negative potential. Only the condenser C3 is connected between two points of negative potential and is not therefore charged. If a timing impulse from the frequency emitter now occurs at the input 18', this impulse can pass only through the condenser C3 to the base of the transistor Tr4, so that this transistor becomes conductive and its output 20 is brought to a negative potential. Hereby, and through the rectifier D4, the potential conditions at the point between the resistors R5 and R6 and thus at the base of the transistor Tr3 are changed, and the latter is converted to the nonconducting condition. The transistor Tr5 is now kept blocked through the rectifier D9. The output signal has thus moved a stage farther on. A further timing impulse shifts the signal to the output 21, and then on to the output 19 and so forth. The signal remains at the outputs until each next timing impulse occurs.

FIG. 12 shows three bistable multi-vibrators of like design, having inputs 25, 26 and 27. The input 25 is connected to the output 19, the input 26 to the output 20, and the input 27 to the output 21. By means of a change-over switch, not illustrated, the output 19 can also be connected to the input 26, and the output 20 to the input 25. The outputs of the multi-vibrators are indicated by the numerals 28, 29; 30, 31; and 32, 33. The rectifiers associated with the inputs and outputs are not numbered. The same applies in the case of the resistors if they are not necessary for explaining the mode of operation.

Each multi-vibrator has two transistors Tr6, Tr7 and Tr8, Tr9 and Tr10, Tr11, the bases of which are each connected to the associated input through condenser C5, C6 and C7, C8 and C9, C10 respectively. The multi-vibrators operate in the known manner so that when an input signal occurs, one transistor passes current and, at the same time, the base of the other transistor is thereby negatively biased in such manner that this is blocked. Also, the condenser associated with the conductive transistor is charged in such manner that, when the next input signal occurs, it is blocked and this input signal renders the second transistor conductive through the other condenser, so that the first transistor is disconnected.

A correction circuit is also provided, however, in the present case. This correction circuit has two conductors. One conductor 34 connects the collectors of the transistors Tr6 and Tr8, by way of rectifiers D4 and D5, to a point between two resistors R17 and R18, which connect the positive conductor to the base of the transistor Tr10. The other conductor 35 connects the collectors of the transistors Tr9 and Tr11, through rectifiers D6 and D7, to a point between two resistors R19 and R20, which connect the positive conductor to the base of the transistor Tr7. When the transistors Tr6 and Tr8 are both blocked and their collectors are at positive potential, the potential at the point between the resistors R17 and R18 is likewise positive. In this way, the potential at the base of the transistor Tr10 is raised and to an extent such that this is obliged to pass current independently of other factors. Thus, the transistor Tr11 is compulsorily brought into its blocked condition, and the requirement that not all three of the controlled rectifiers of like polarity should simultaneously be in the same condition in the inverted converter, is fulfilled. The conductor 35, which causes the transistor Tr7 to pass current when the transistors Tr9 and Tr11 are both blocked, works in the same way.

If only one of the transistors Tr6 and Tr8 or Tr9 and Tr11 is conductive, then the correction circuit does not influence the control of the multi-vibrators.

The outputs 28–33 of the bistable multi-vibrators are connected to the inputs of a blocking oscillator, only one blocking oscillator being shown in FIG. 13. Its input 36 is connected directly to the base of a transistor Tr12. The emitter is connected to a conductor 37 which is connected to the negative conductor by way of a Zener diode 38. The emitters of the transistors of the other blocking oscillators are also connected to the conductor 37. The Zener diode keeps the emitter voltage constant, i.e. at a few volts above the negative voltage. The primary winding 39 of a transformer T2 is contained in the collector circuit, the secondary winding 40 of this transformer acting as a feed-back and its tertiary winding 41 being connected to the output 42, which corresponds to one of the outputs 1–6 of FIG. 6.

If a positive voltage is applied to the input 36, the blocking oscillator produces a high-frequency output signal. If a negative voltage is applied to the output 36, no signal is sent.

The embodiments illustrated can be modified in various ways, without departing from the basic conception of the invention. For example, use can also be made of a normal gate circuit, which passes or blocks impulses produced by a frequency generator, depending upon the input signal.

What is claimed is:

1. A generator for producing control signals for firing the six controllable rectifiers of a three-phase converter having common quenching means, comprising; a controllable frequency emitter having an output of a frequency six times as great as a required three-phase frequency, a three-stage annular counter connected to be controlled by the output of said frequency emitter and having three outputs, three two-stage frequency dividers each of which is connected to be controlled by one of the outputs of said annular counter and each of which has two outputs, means including the outputs of said frequency dividers adapted to control the firing of the controllable rectifiers of the three-phase converter, including NAND stages.

2. A generator as defined in claim 1 including a correction circuit interconnecting said three frequency dividers and operative to insure the proper sequence of firing of the controllable rectifiers.

3. A generator as defined in claim 2 wherein said correction circuit is operative in response to a condition of said frequency dividers which is effective to produce similar control of three adjacent controllable rectifiers of the three-phase converter.

4. A generator as defined in claim 3 wherein said correction circuit is effective, upon said frequency dividers tending to produce similar control of three adjacent controllable rectifiers, to invert the control of one of the firing of the controllable rectifiers.

5. A generator as defined in claim 1 wherein said controllable frequency emitter is a uni-junction oscillator having a capacitor which is charged in accordance with a control input, the generator including means connecting the output of said oscillator in controlling relation to the common quenching means.

6. A generator as defined in claim 5 wherein the six controllable rectifiers and the common quenching means are controlled through transformers.

7. A generator as defined in claim 6 wherein the transformer controlling the common quenching means includes a feedback winding connected as a portion of said oscillator.

8. A generator as defined in claim 1 wherein each of the two-stage frequency dividers is a bistable multivibrator, and wherein said last named means includes six gate circuits, one connected to each of the outputs of the three multivibrators, each two of the gate circuits which are connected to a single multivibrator being adapted to control the firing of two series-connected controllable rectifiers, each of said multivibrators including two transistors, the generator including a correction circuit having the base of one of the transistors of a first multivibrator connected through rectifiers to the collector of one of the transistors of each of the second and third multivibrators, and having the base of the other transistor of said third multivibrator connected through rectifiers to the collector of the other transistors of each of said first and second multivibrators.

9. A generator as defined in claim 8 wherein said gate circuits are blocking oscillators and wherein the outputs of said three multivibrators are connected thereto through rectifiers to sequentially render three of said blocking oscillators operative.

10. A generator as defined in claim 9 wherein said blocking oscillators are energized from a common supply voltage by means of a circuit including a Zener diode.

References Cited

UNITED STATES PATENTS

| | | | |
|---|---|---|---|
| 3,388,310 | 6/1968 | Etter | 321—5 |
| 3,406,325 | 10/1968 | Rosa | 321—5 |
| 3,465,234 | 9/1969 | Phadke | 321—5 |
| 3,466,525 | 9/1969 | Ainsworth | 321—5 |
| 3,477,010 | 11/1969 | Nard | 321—5 |

WILLIAM M. SHOOP, JR., Primary Examiner